(12) United States Patent
Mack (10) Patent No.: US 7,761,305 B2
(45) Date of Patent: Jul. 20, 2010

(54) SYSTEM AND METHOD OF PROVIDING CURRENT HOTEL DAILY RATE AND AVAILABILITY INFORMATION AND THE LIKE

(76) Inventor: Leslie J. Mack, 205-C Quail Haven Dr., Columbus, OH (US) 43235-5658

( * ) Notice: Subject to any disclaimer, the term of this patent is extended or adjusted under 35 U.S.C. 154(b) by 1590 days.

(21) Appl. No.: 10/686,928

(22) Filed: Oct. 16, 2003

(65) Prior Publication Data

US 2005/0086086 A1  Apr. 21, 2005

(51) Int. Cl.
*G06Q 99/00* (2006.01)
(52) U.S. Cl. ........................................................ 705/1.1
(58) Field of Classification Search ........................ 705/1
See application file for complete search history.

(56) References Cited

U.S. PATENT DOCUMENTS 6,434,533 B1 * 8/2002 Fitzgerald .................... 705/10

* cited by examiner

*Primary Examiner*—Jonathan Ouellette
(74) *Attorney, Agent, or Firm*—Porter, Wright, Morris & Arthur, LLP (57) ABSTRACT

A system and method for providing current daily rate and availability information includes a computer receiving current daily rate and availability information from a plurality of hotels. The computer prepares and provides a unique report for each of the plurality of hotels including current daily rate and availability information for a list of competing hotels and occupancy percentage and average daily rate information for a predetermined area. The computer can fax the unique reports to the plurality of hotels and/or provide the unique reports to the plurality of hotels over a computer network such as the Internet.

17 Claims, 9 Drawing Sheets

Fig. 1

GENERAL AREA INFORMATION

- On Property
- Within Walking Distance
- 1 – 5 Miles

Property Location
1. Airport
2. Beach
3. City
4. Downtown
5. East

Attraction Category
1. Airport
2. Amusement park
3. Aquarium
4. Auditorium
5. Beach

Reference Point
1. Airport
2. Amusement park
3. Arena
4. Bar
5. Bay

Transportation
1. Bicycle
2. Boat
3. Bus
4. Cable car
5. Car

Recreation Type
1. Archery
2. Badminton court
3. Baseball diamond
4. Basketball court
5. Beach

INIVIDUAL PROPERTY

Hotel Name

Address

City, state, zip

Phone

Fax

E-mail

Contact person

Reservations phone

Internet address

Brand affiliation contact

Number of rooms by type
Smoking / non-smoking

Rack rate by type

Fig. 2

HOTEL INFORMATION

- On Property
- Within Walking Distance
- 1 – 5 Miles

Hotel Amenity
1. 24-hour front desk
2. 24-hour room service
3. 24-hour security
4. Adjoining rooms
5. Air conditioning

Contact Services
1. Concierge
2. Golf pro
3. Spa
4. Front desk
5. Bell stand

Personal Services
1. Dry cleaning
2. Ironing
3. Laundry
4. Maid service
5. Massage

Business Services
1. Computer
2. Copier
3. Cordless phone
4. Data port
5. Desk

Phone Technology
1. Voice
2. Data
3. Fax
4. Pager
5. Mobile

Security Features
1. 2nd lock on guest doors
2. Address of nearest police station
3. Alarms continuously monitored
4. Audible alarm smoke detectors
5. Auto link to fire station

Pets Policy Code
1. Cats only
2. Dogs only
3. Large domestic animals
4. Midsize domestic animals
5. Small domestic animals only

Payment Type
1. Cash
2. Credit card
3. Debit card
4. Business check
5. Personal check

Available Meal Category
1. Breakfast
2. Brunch
3. Dinner
4. Happy hour
5. Lunch

Cuisine Code / Food Service Type
1. American
2. French
3. Italian
4. Seafood
5. Indian

Restaurant Category
1. All purpose
2. Beverage
3. Buffet
4. Café
5. Cafeteria

Restaurant Service Info
1. Buffet
2. Casual dining
3. Catering
4. Cooked to order
5. Fine dining

Fig. 4

ROOM INFORMATION

Bed Type
1 Double
2 Futon
3 King
4 Murphy bed
5 Queen

Guest Room Info
1 Physically challenged rooms
2 Nonsmoking rooms
3 Suites
4 Bungalows and villas
5 Floors

Room Amenity Type
1 Adjoining rooms
2 Air conditioning
3 Alarm clock
4 All news channel
5 AM/FM radio

Fee Tax Group Code
1 Bed tax
2 City hotel fee
3 City tax
4 County tax
5 Energy tax

Fig. 6

PROPERTY INFORMATION

Brand Category
1 All suite
2 Budget
3 Corporate business transient
4 Deluxe
5 Economy

Segment Category
1 All suite
2 Budget
3 Corporate business transient
4 Deluxe
5 Economy

Architectural Style
1 Art deco
2 Brazilian
3 Contemporary
4 High rise
5 Historic

Property Class Type
1 All suite
2 All-Inclusive resort
3 Apartment
4 Bed and breakfast
5 Cabin or bungalow

Hotel Brand Names
HOTEL BRAND NAMES
A – Z – (Not in the OTA codes)

POST INN NOTE
POST INN NOTE
POST INN NOTE

HOTEL NAME
DATE & TIME

○ % & ADR TODAY
○ % & ADR TOMRO

HOTEL NAME
WELCOMES YOU TO
COLUMBUS

IN TOWN THIS WEEK

James Taylor, Wed., 7pm
Germaine Amphitheater
I-71 & Polaris
431-3600 for tickets Crew vs. San Jose, Fri., 7pm
I-71 & 17th Ave.
555-1234 for tickets Arts Festival, Sat & Sun.
300 Ohio Artists & Crafts
Civic Center Downtown
FREE Civil War Re-Enactment,
Ohio Village
$5 Adults/$3 child
Sat & Sun, 10am–4pm
I-71 & 17th Ave

VISIT COLUMBUS
METRO PARKS

Highbanks, North Columbus,
SR 23 and Powell Road
Ancient Mounds, Nature Center,
Walking Paths, Dawn to Dusk

ADVERTISEMENT
HERE

| | | ROOM TYPE | $$$ | NON | /SMOKE |
|---|---|---|---|---|---|
| MY HOTEL Address Phone | | A | $59 | 20 | 22 |
| | | B | $69 | 3 | 6 |
| | | C | $79 | 12 | 13 |
| Hotel 1 Address Phone | Directions | A | $ | | |
| | | B | $ | | |
| | | C | $ | | |
| Hotel 2 Address Phone | Directions | A | $ | | |
| | | B | $ | | |
| | | C | $ | | |
| Hotel 3 Address Phone | Directions | A | $ | | |
| | | B | $ | | |
| | | C | $ | | |
| Hotel 4 Address Phone | Directions | A | $ | | |
| | | B | $ | | |
| | | C | $ | | |
| Hotel 5 Address Phone | Directions | A | $ | | |
| | | B | $ | | |
| | | C | $ | | |
| Hotel 6 Address Phone | Directions | A | $ | | |
| | | B | $ | | |
| | | C | $ | | |

SYSTEM AND METHOD OF PROVIDING CURRENT HOTEL DAILY RATE AND AVAILABILITY INFORMATION AND THE LIKE

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

FIELD OF THE INVENTION

The present invention generally relates to an information providing system and method and, more particularly, to a system and method which provides current hotel daily rate availability information and the like to hotels, visitor bureaus, travelers, and/or other parties interested in such information.

BACKGROUND OF THE INVENTION

Hotel daily room rates or rack rates are typically predetermined in advance as much as six months to a year or more by using many different types of forecasting formulas. Once determined, the daily rates for rooms and any discounts are entered into the hotel's reservation system and made available over a Global Distribution system (GDS). A hotel, however, can sell a room for any price and considers doing so when, for example, rooms for the current day are unsold (typically referred to as "distressed inventory"). If a room goes unsold for a given night, there is no way to recover the lost revenue. Deciding when to make a rate adjustment on distressed inventory is typically based on the hotel's current room availability and other current market conditions which were not known at the time the daily rates were predetermined.

Many hotels have employees telephone competing hotels in the surrounding area to exchange current rates and number of rooms available. This process is typically called a "call-around". Hotel managers use the information from the call-around to price any of its remaining rooms based on the area's current market conditions. That is, the hotel manager checks the call-around report to see if the hotel should make real-time rate adjustments for any remaining inventory that day. When there are many comparable rooms available in the area, daily rates are typically lowered. Likewise, when there are little or no comparable rooms available in the area, daily rates are typically raised.

The call around report can also be used by front desk personnel to solve overbooking or sold-out problems. Overbooking is a common hotel practice where rooms are overbooked by a certain percentage based on historical trends for no-shows. A hotel is overbooked when it has no available rooms but still has guests arriving with guaranteed reservations. In an overbooked situation, the front desk personnel can use the call-around report to call other hotels to find an available comparable room and make a reservation for the overbooked guest. When the guest arrives to check in the hotel, they are told the hotel is overbooked but a reserved room awaits at the other hotel. In sold out situations, the front desk personnel can use the call-around report to refer walk-in customers or late customers with non-guaranteed rooms which were automatically cancelled at a predetermined deadline to other hotels having rooms still available. The potential customers usually appreciate the referral, as opposed to being told to "hit the street", and as a result are much more likely to return to the hotel in the future.

While the above-described call around service can at times provide desirable results, it can be a very time consuming process. Often the hotel personnel are too busy to finish, or even start, calling all the competing hotels. Without the call-around report, rooms can be over or under priced for the current market conditions. As a result, the front desk personnel can have no available rooms, no referral information, and many tired and angry potential customers. Even when a call-around report is available, the front desk can be left with no referral information if the limited number of hotels on the call around report are also sold out. In this situation, the front desk personnel are left with the options of either the time consuming process of calling all around town or further for referrals or simply turning away angry potential customers. Accordingly, there is a need in the art for an improved way of obtaining hotel rate and occupancy information.

SUMMARY OF THE INVENTION

The present invention provides an information providing system and method which overcomes at least some of the above-noted problems of the related art. According to the present invention, a method for providing hotel information includes the steps of receiving current daily rate and availability information from a plurality of hotels and preparing and providing a report to the plurality of hotels including current daily rate and availability information of other hotels.

According to another aspect of the present invention, a system for providing hotel information includes a computer connected to a communication system. The computer is programmed to receive current daily rate and availability information from a plurality of hotels. The computer is also programmed to prepare and provide a report to the plurality of hotels including current daily rate and availability information of other hotels.

According to another aspect of the present invention, a method for providing hotel information includes the steps of, in combination, receiving current daily rate and availability information from a plurality of hotels and preparing and providing a unique report for each of the plurality of hotels including current daily rate and availability information for a list of competing hotels and occupancy percentage and average daily rate information for a predetermined area.

From the foregoing disclosure and the following more detailed description of various preferred embodiments it will be apparent to those skilled in the art that the present invention provides a significant advance in the technology and art of providing hotel occupancy information. Particularly significant in this regard is the potential the invention affords for providing a high quality, reliable, low cost system and method. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved system and method disclosed herein. The following detailed discussion of various alternative and preferred embodiments will illustrate the general principles of the invention with reference to providing hotel occupancy information. Other embodiments suitable for other applications will be apparent to those skilled in the art given the benefit of this disclosure.

Figure 1:
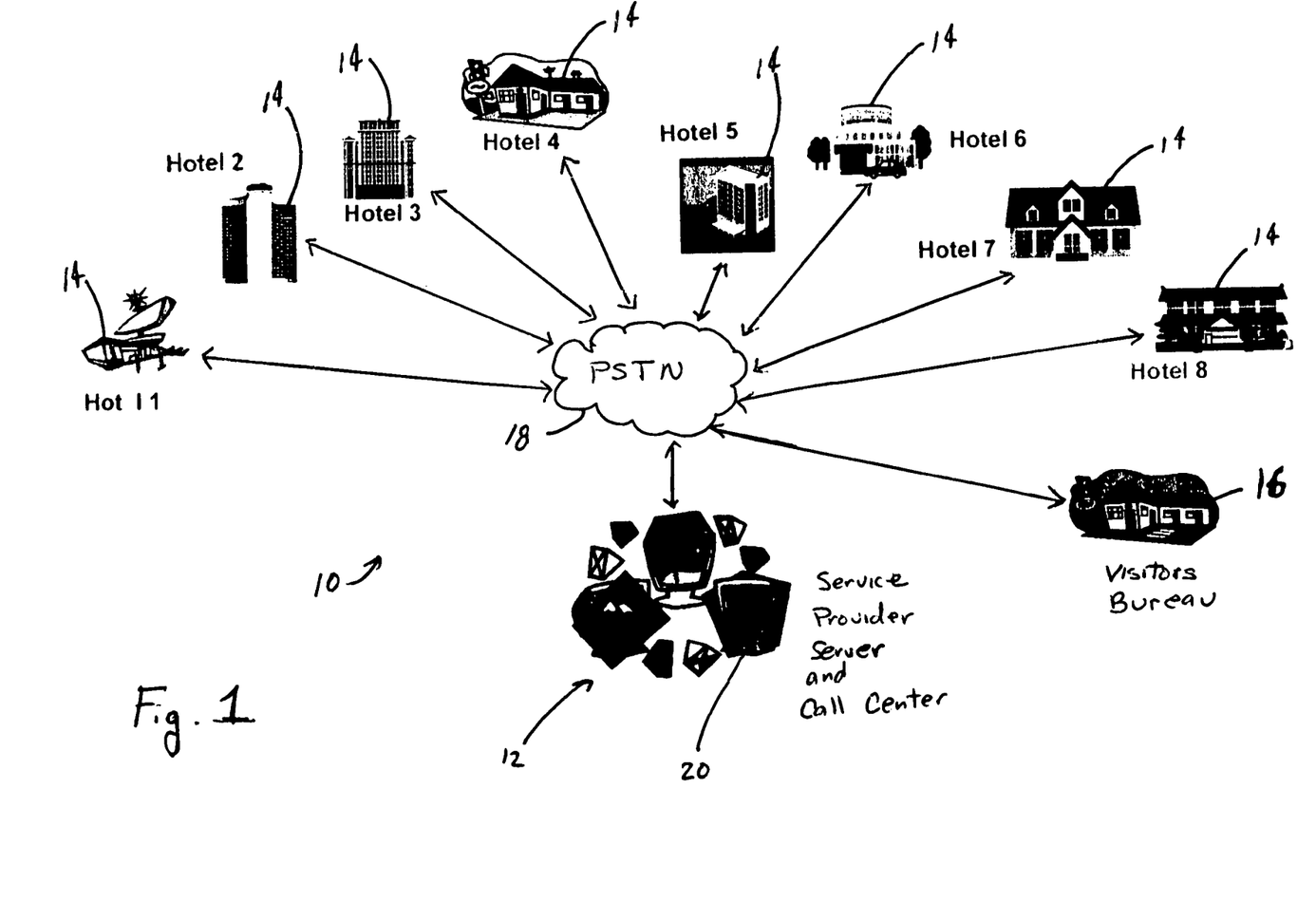
FIG. 1 is a schematic view of a system for providing hotel occupancy information according to a preferred embodiment of the present invention.

Referring now to the drawings, FIG. 1 schematically shows a system 10 for providing hotel occupancy information according to a preferred embodiment of the present invention. The system 10 includes a service provider 12, a plurality of hotels 14 at locations remote from the service provider 12, at least one city, county or state visitors bureau 16 or the like, and a communication system 18 with which the service provider 12, the plurality of hotels 14, and the at least one visitors bureau 16 can readily exchange information.

The service provider 12 can include manual and/or automatic means for exchanging information with the plurality of hotels 14. The manual means can be in the form of a call center having telephone operators so that personnel of the plurality of hotels 14 can call the call center and talk to the operators via telephones to exchange information. The automatic means can be in the form of at least one server or computer 20 having suitable processing means, memory means, and software to automatically exchange information with the plurality of hotels 14. The computer 20 and software are preferably adapted to exchange information according to the method described in detail hereinafter. It is noted that the manual and automatic means for exchanging information can be at the same location or at different locations.

The illustrated embodiment shows the system 10 having eight hotels 14 but there can be a fewer or greater number of hotels 14. The hotels 14 can be located over any geographic area such as a city, county, state, region, country, a portion of city, county, state, or country, a plurality of cities, counties, states or countries, or any other desirable geographic area. The hotels 14 can be of any type such as, for example, luxury, deluxe, economy, budget, cabin, hostel, all suite, corporate, or bed and breakfast. It is noted that the term "hotel" is used in this specification and in the claims to mean a public or private house which provides lodging and sometimes food and other services for others including but limited to inns, motels, cabins, boutique sleep, bed and breakfasts, campgrounds, and the like.

The at least one visitors bureau 16 is included to provide information about current events or places which would be of interest to individuals staying at the hotels 14. The visitors bureau 16 can be associated with a city, county, state, region or country. Preferably, there is at least one visitors bureau 16 which can provide information relating to the area where each of the hotels 14 is located.

The illustrated communication system 18 is a public switched telephone network (PSTN) which enables the plurality of hotels 14 to communicate with the call center and/or the computer 20 via a telephone, facsimile (fax) machine, and/or modem, of either land line type or wireless type, to exchange information. It is noted that the communication system 18 can be of any suitable type or combination such, as for example, the Internet, an intranet, wireless system, global positioning satellite (GPS) system or other satellite system, microwave system, cellular system, cable system, or the likes.

Figure 2:
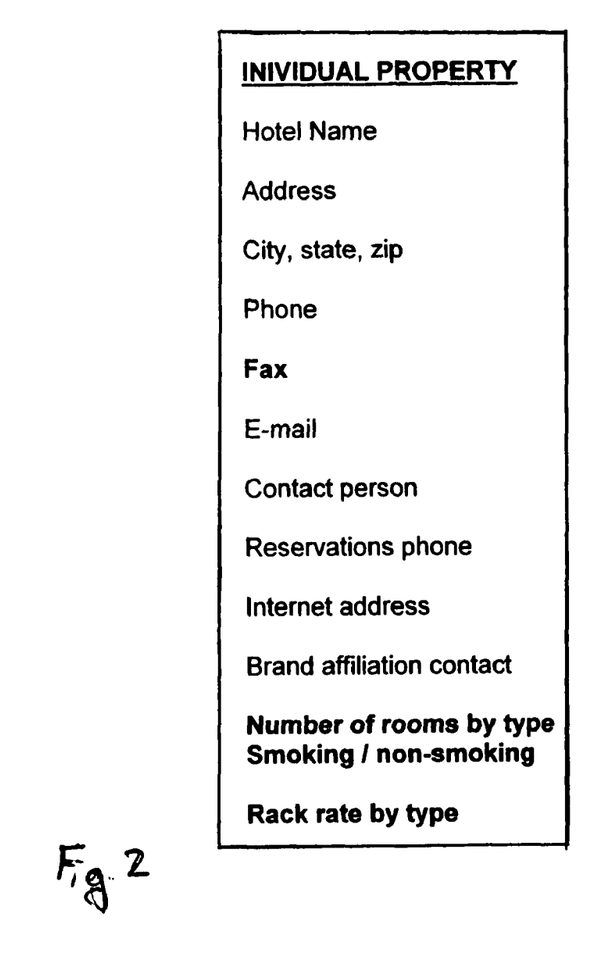
FIG. 2 is a table of suitable individual property information which can be provided by each participating hotel of the system of FIG. 1.
Figure 3:
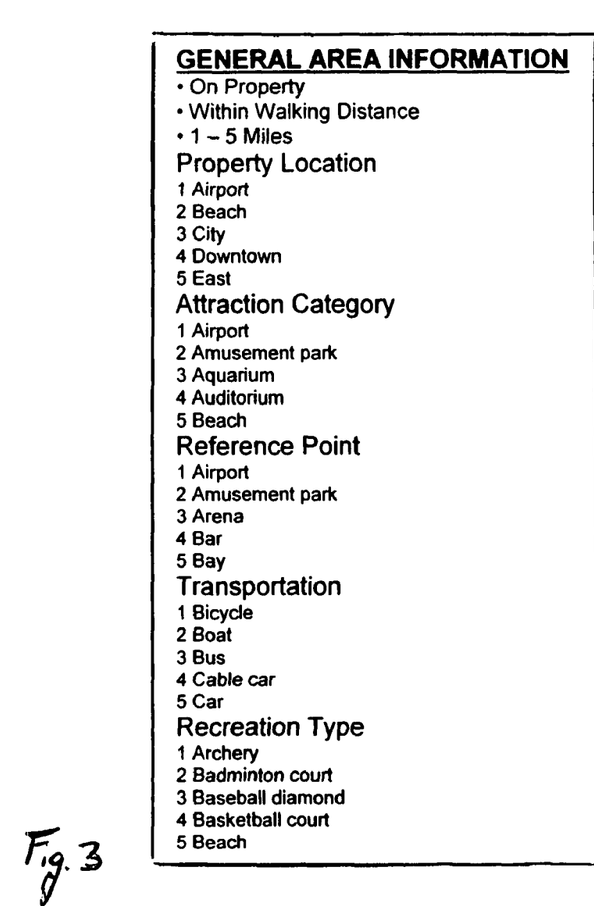
FIG. 3 is a table of suitable general area information which can provided by each participating hotel of the system of FIG. 1.
Figure 4:
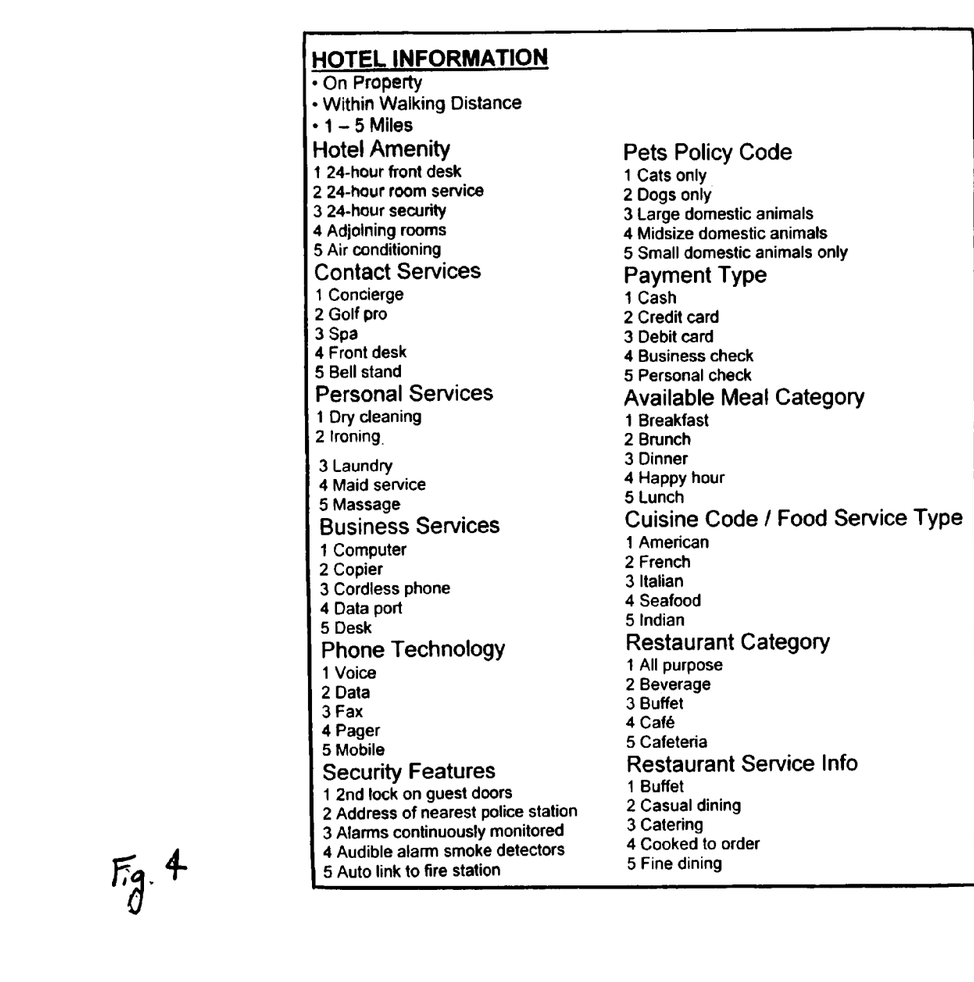
FIG. 4 is a table of suitable hotel information which can provided by each participating hotel of the system of FIG. 1.
Figure 5:
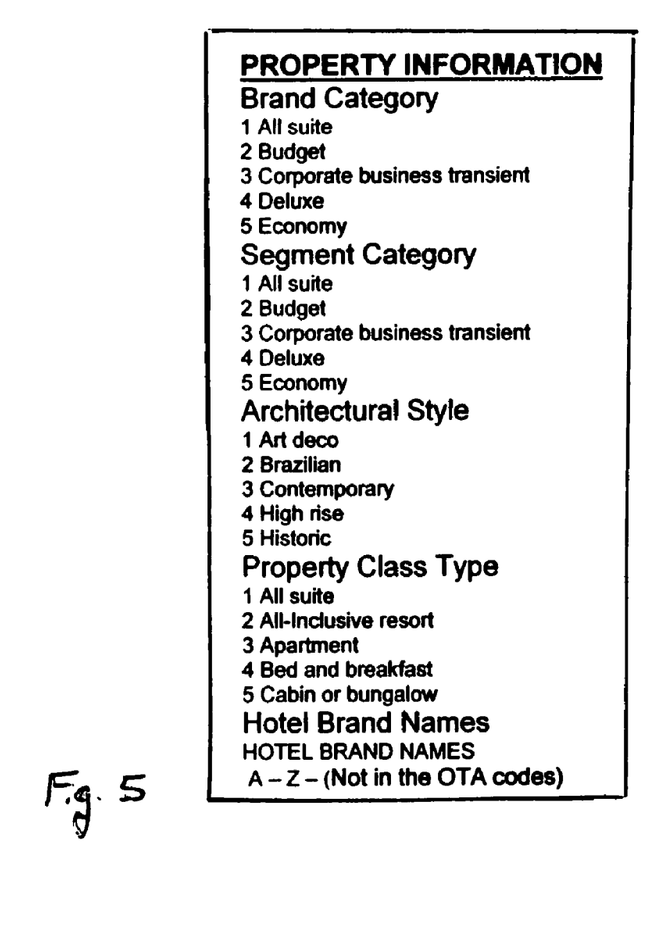
FIG. 5 is a table of suitable property information which can provided by each participating hotel of the system of FIG. 1.

As best shown in FIG. 2, each hotel 14 provides the service provider 12 with information related to its individual property. The information preferably includes its phone number, its name and address, its phone number, its fax number, the total number of rooms per type (including smoking/non-smoking) for the hotel, and the hotel's rack rate for the rooms per type. The service provider 12 then preferably provides the hotel 14 with an account number and instructions to call the computer and provide additional information for describing the hotel 14.

Figure 6:
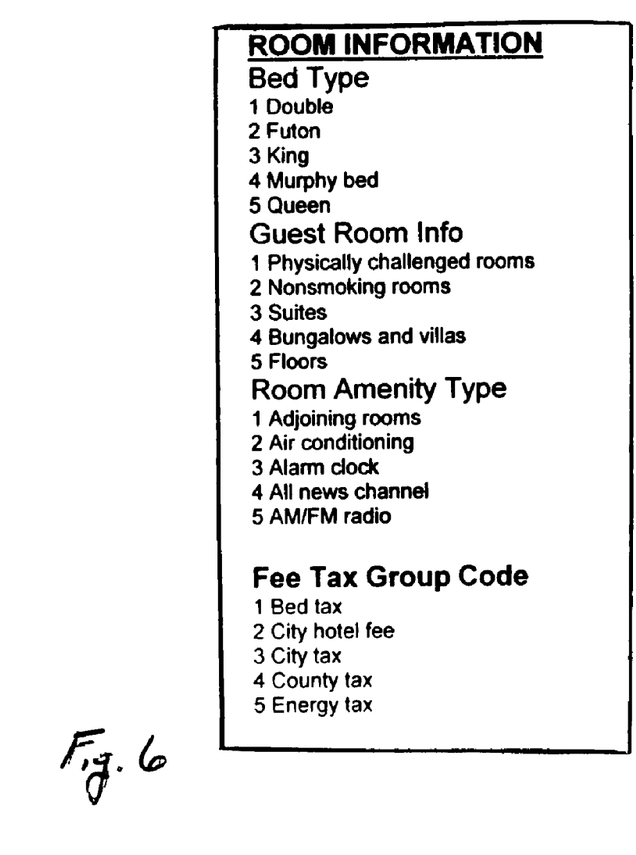
FIG. 6 is a table of suitable room information which can provided by each participating hotel of the system of FIG. 1.

As best shown in FIGS. 3 to 6, each hotel 14 preferably provides additional information describing the hotel 14 which can be used to determine similar hotels 14 and/or to allow potential customers to select a suitable hotel 14. This information is preferably provided to the computer 20 the first time the hotel 14 calls in to the computer 20 and then can be updated whenever desired by again calling the computer 20. The illustrated embodiment includes additional information in the categories of general area information (FIG. 3), hotel information (FIG. 4), property information (FIG. 5), and room information (FIG. 6). The general area information is primarily tourist information including area attractions, locations, transportation, reference points, and recreation. The hotel information is hotel specific information but can also relate to a location off the property. For example, a casino, bookstore, health club, live entertainment, playground, or more, could be located off property and not immediately at the hotel. The illustrated embodiment includes the selections "on property", "within walking distance", and "1 to 5 miles away" as a way to include more information in this regard. The property description information is hotel specific and relates to the brand and class of the hotel. The room information is also hotel specific and relates to types and features of rooms at the hotel. The illustrated information utilizes codes developed by the Open Travel Alliance (OTA) to ease the creation of a suitable property description for each hotel. The OTA is a non-profit group which developed a standard universal XML messaging code specific for the travel and hotel industries. It is noted that the OTA codes are shown by way of example only, alternatively any other suitable codes or other methods can be utilized which enables the hotels 14 to create property descriptions.

Once the hotel 14 supplies its customized property description to the computer 20, the information is stored in the computer's database. The computer 20 the searches the database to determine all the comparable hotels 14 in the area, city, county, and state which are in the database and part of the system 10. A comprehensive list of competitive hotels 14 is prepared from which the hotel 14 can select which of the competing hotels 14 it wants linked to its unique, customized report 22 (FIG.). It is noted that the hotel 14 can also add any other hotel or hotels 14 that it wants to include on its report 22. If desired, the hotel 14 can obtain a list of hotels 14 which have included it on their customized reports 22. Once the hotel 14 makes its selections, the selected hotels 14 are linked to the hotel's report 22 for future use.

Once the plurality of hotels 14 have joined the system 10 and provided adequate information regarding their property, each hotel 14 preferably contacts the service provider 12 on a regular basis to provide information regarding its current room availability (or occupancy), and its current rack rates. The hotels 14 contact the service provider 12 preferably on a daily basis, more preferably once per shift, and even more preferably once per shift plus whenever a significant change occurs. It is noted that alternatively or additionally the computer 20 can be adapted to automatically call or otherwise notify the hotels 14 at desired times and request the information. It is also noted that the computer 20 can be adapted to automatically call or otherwise notify the hotels 14 with reminders and/or requests for information when the hotels 14 have not called prior to predetermined times. In the illustrated embodiment, the hotels 14 each call the service provider computer via a telephone to provide the information but other suitable methods of contacting the service provider 12 can be utilized. Preferably, the hotels 14 each call the service provider 12 at least once per shift prior to specified times such as, for example, 7 am, 3 pm, and 11 pm when the customized reports 22 are to be generated and sent to the hotels14. It is noted that other quantities of specified times and/or other hours of the day can be utilized.

Figure 7:
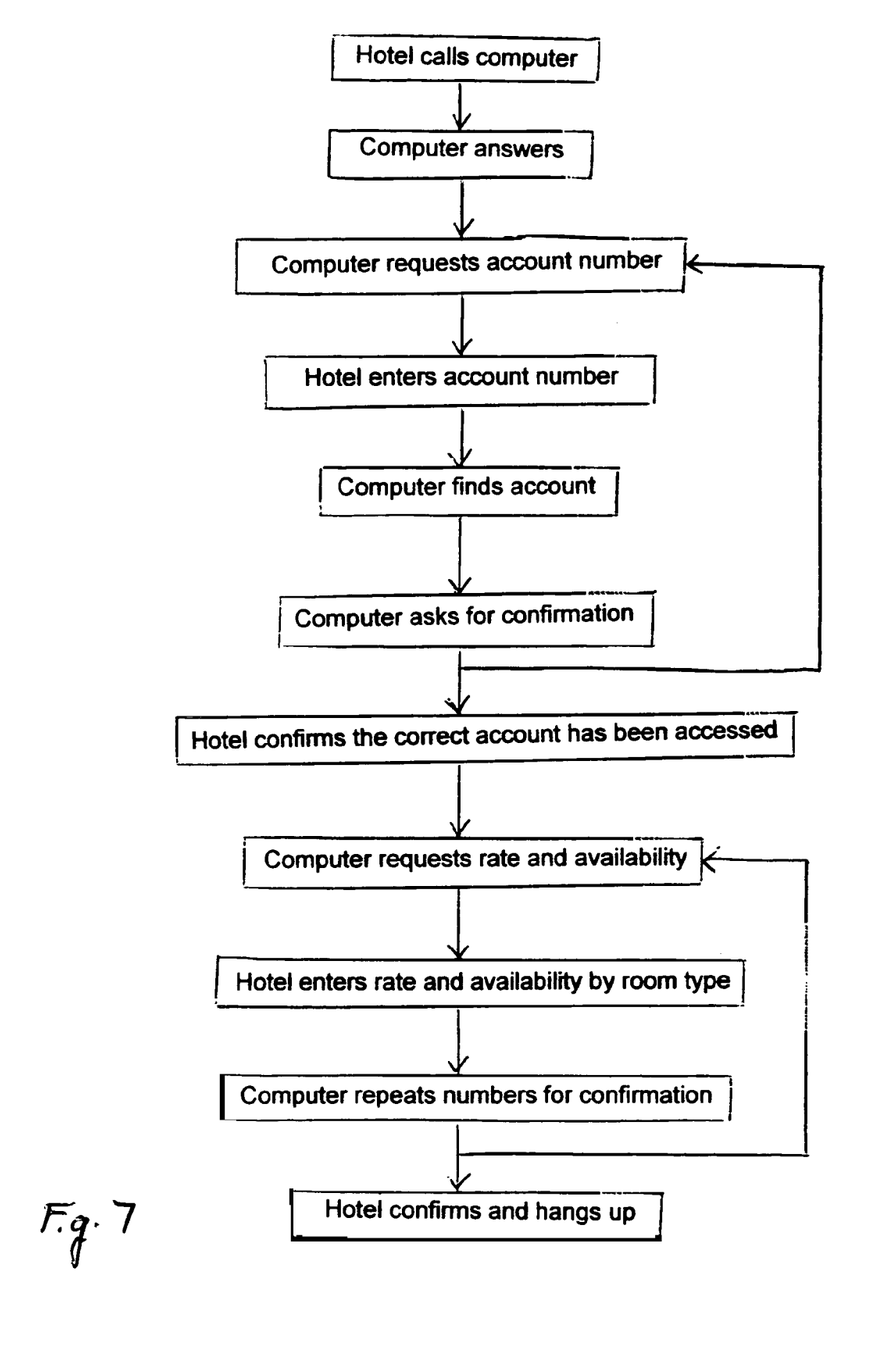
FIG. 7 is a flow chart showing a preferred method according to the present invention for each participating hotel to provide its occupancy information to the system of FIG. 1.

As best shown in FIG. 7, according to the illustrated preferred embodiment, each hotel 14 separately calls the service provider computer 20 via telephone and the computer 20 automatically answers the call. The computer 20 automatically requests the hotel 14 to enter its unique account number which the service provider 12 has assigned to that particular hotel 14. The computer software can be adapted to receive the information by touch tones and/or voice as desired. Once the computer 20 receives the account number from the hotel 14, the computer 20 finds the hotel's account and asks for confirmation from the hotel 14. The confirmation process can be in any suitable manner and can include, for example, a pass word. If confirmation is not successfully completed, the computer 20 again requests the account number. If confirmation fails a predetermined number of times such as, for example, three times, the computer 20 preferably automatically terminates the telephone connection. Once confirmation is successful, the computer 20 asks the hotel 14 to provide daily rate and availability information. The daily rate and availability information preferably includes: the hotel's current daily rate and availability by room type for that day; the previous day's average rate and total occupancy (typically referred to as revenue per average room or RevPAR); and the current daily rate and availability for the next day. It is noted that the computer 20 can interchangeably request availability and occupancy information because the computer 20 can calculate the other if it is provided one. The hotel 14 then enters the daily rate and availability information. The computer software can be adapted to receive the daily rate and availability information by touch tones and/or voice as desired preferably prompts the hotel 14 to enter the data one item at a time. Once the computer 20 receives the information from the hotel 14, the computer 20 repeats the information and asks for confirmation from the hotel 14. If confirmation is not successfully completed, the computer 20 requests for the information to be re-entered. Once confirmation is successful, the process is complete and the computer 20 automatically terminates the telephone connection. Preferably, prior to terminating the connection, the computer 20 inquires whether the hotel 14 would like to change its property description, its list of linked competitive hotels, or any other information.

Figure 8:
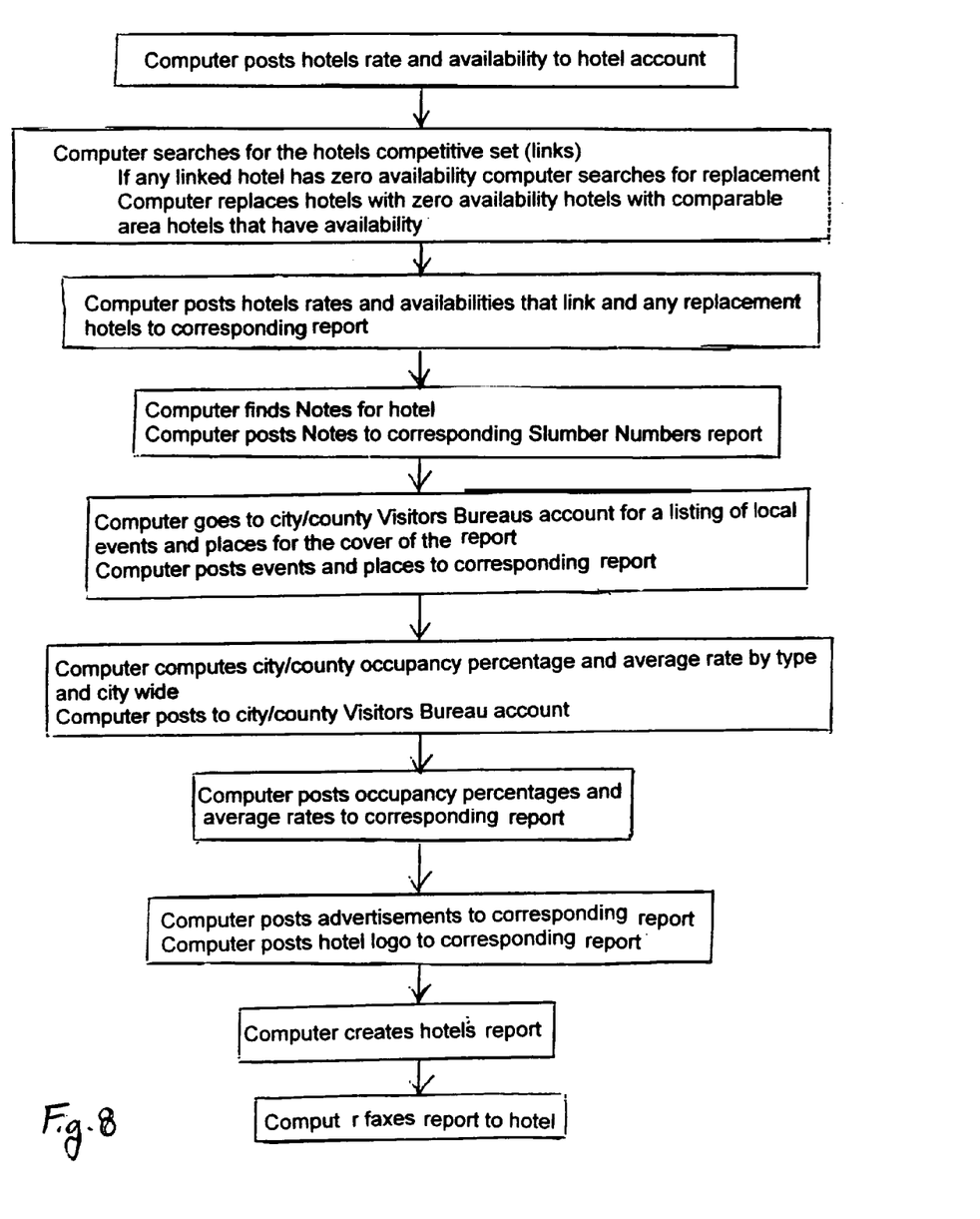
FIG. 8 is a flow chart showing a preferred method according to the present invention for server to prepare and provide a customized report of the occupancy information to each participating hotel of the system of FIG. 1.

As best shown in FIG. 8, the computer 20 stores the rate and availability information for the hotel 14 as the current rate and availability for the hotel 14. After the predetermined deadline for all of the hotels 14 to report, the computer 20 prepares a unique, customized report 22 (FIG. 9) for each hotel 14. It is noted that alternatively the computer 20 can automatically generate the report 22 each time the hotel 14 updates its account but this may result in preparing reports 22 prior to receiving all current information from the other hotels 14. Preferably, the computer 20 checks to ensure that all hotels 14 have reported prior to generating the reports 22 and notifies each hotel 14 that is delinquent in reporting. Once all the hotels 14 have reported, the computer 20 generates the reports 22. If after a predetermined period of time there is still at least one delinquent hotel 14, the reports 22 are generated without the delinquent information. Preferably, the delinquent hotel 14 does not receive its report 22 in order to encourage the timely supply of information.

To prepare each customized report 22, the computer 20 searches for the set of competitive hotels 14 which are linked to the particular hotel 14. While the illustrated report shows six linked hotels 14, a greater or lesser number of competitive hotels 14 can be linked to the hotel 14. Upon locating the linked competitive hotels 14, if any linked competitive hotel 14 has no current availability, that is identifies zero rooms as available, the computer 20 automatically searches for a replacement competitive hotel 14 based on the property description of the hotel 14. Criteria for searching for replacement hotels 14 can be based on, for example, hotels 14 of similar type, nearest location, and/or most available rooms. If a replacement hotel 14 is provided in a situation where the hotel 14 has previously identified its linked competitive hotels 14, the report 22 can indicate that a replacement hotel 14 is provided or include the replacement hotel 14 in addition to the linked hotel 14 being identified as having no current availability. The computer 20 then inserts the rate and availability for the linked competitive hotels 14 and any replacement competitive hotels 14 into the customized report 22 for that specific hotel 14.

Figure 9:
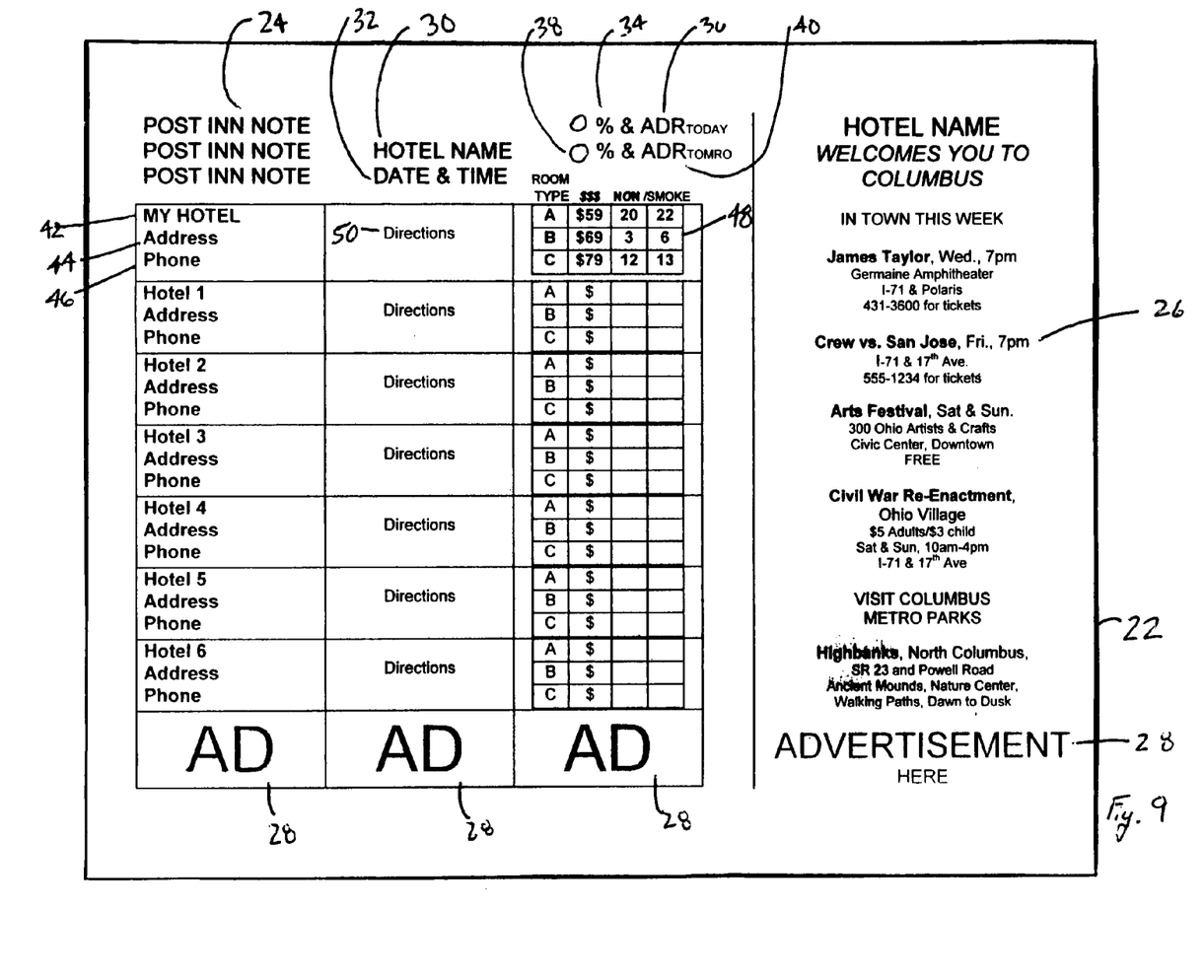
FIG. 9 is schematic view of a customized report prepared by the method of FIG. 8 to be provided to each participating hotel of the system of FIG. 1.

The computer 20 determines if there are any notes 24 (FIG. 9) for the specific hotel to be provided on the report 22. Preferably, the hotel 14 has the ability to identify custom notes or reminders 24 to the service provider 12 to be provided on the report 22. The computer 20 then inserts any notes 24 in the report 22 for the hotel 14. The computer 20 then determines a current list of local events and places 26 (FIG. 9). The list of current local events and places 26 is located in the account for the applicable city/county visitors bureau 16 for the hotel 14. The computer 20 then inserts the list of current local events and places 26 in the report 22 for the location of the hotel 14. The visitors bureau 16 preferably updates the list of current local events and places 26 on a regular basis such as, for example, once a week, once a day, or any other suitable time frame.

The computer 20 preferably computes occupancy and average daily rate (ADR) information. The occupancy and average daily rate (ADR) information preferably includes an occupancy percentage and average daily rate for a predetermined region, city, county, state or other area on the day of the report 22 and for the next day after the day of the report 22. The predetermined area is preferably the area associated with the visitors bureau 16. The computed occupancy and average daily rate (ADR) information is then stored in the applicable visitors bureau's account and in the customized report 22 for the hotel 14. It is noted that alternatively or additionally the hotel 14 can request occupancy and average daily rate information different than that provided to the visitors bureau 16.

The computer 20 determines if there are any advertisements 28 (FIG. 9) for the specific hotel 14 to be provided on the report 22. The computer then inserts any advertisements 28 in the report 22 for the hotel 14. The advertisements 28 can be sold by the service provider 12 and/or the hotel 14. The computer 20 then inserts the hotel's name and/or logo 30 (FIG. 9) on the report 22 and finalizes the report 22. Finally, the computer 20 faxes or otherwise provides the report to the hotel 14. It is noted that the report 22 can alternatively be sent by other means such as, for example, email and/or the report can be made available for viewing over a computer network 18. The computer 20 performs this process to prepare and send a customized report 22 to each of the hotels 14. The reporting process is then repeated at the next predetermined period such as, for example the next shift. It is noted, however, that additional reports 22 can be prepared and sent between normal reporting times under unique circumstances such as when an update is requested or when circumstances dictate such. For example, if a hotel 14 releases a block of rooms, calls to the computer 20 to report the release, and the computer 20 determines that the hotel 14 is in a sold out or near sold out area, the computer 20 immediately prepares and sends an updated notice to all hotels 14 which are linked to the releasing hotel 14. The new faxed report 22 informs the other hotels 14 in the area that additional rooms have been made available so that referrals can be made to that hotel 14.

As best shown in FIG. 9, the illustrated report 22 includes the hotel's name and logo 30, the date and time of the report 32, and any notes 24 for the hotel 14. The illustrated report 22 also includes the occupancy and average daily rate (ADR) information, that is, the occupancy percentage 34 and average daily rate (ADR) 36 for the day of the report 22 and the occupancy percentage 38 and average daily rate (ADR) 40 the next day after the day of the report 22. The illustrated report 22 identifies the name 42, address 44, phone number 46, and the availability and daily rate information 48 by room type for the hotel 14 as well as six linked competing hotels 14. Directions and/or maps 50 for each of the competing hotels 14 are also provided so that referrals can easily travel from the hotel 14 to each of the linked competing hotels 14. The directions and/or maps 50 can be obtained from available mapping services such as, for example, Map Quest, Yahoo, or the like. The illustrated report 22 shows that advertisements 28 or public service announcements or other indicia can be included. The listing of current events and places 26 provided by the applicable visitors bureau 16 is also provided. It is noted that the illustrated report 22 is provided by way of example only and can alternatively take many different forms and can include a wide variety of additional and/or alternative information as desired.

While the illustrate report 22 has occupancy and daily rate (information) including a two percentages, the report 22 preferably includes four percentages which reflect the percent occupancy of the total capacity and the average daily rate (ADR) in the region, city, county, state or other predetermined area. Two of the percentages represent the percent occupancy of the area's total capacity and the average daily rate (ADR) for both today and tomorrow and includes all hotel types. The other two of the percentages represent today and tomorrow's occupancy percentage and average date rate (ADR) for only the specific type of hotel 14. For example, if the hotel 14 is upscale, the report 22 includes an occupancy percentage and average daily rate of all the upscale hotels 14 in the predetermined area for both today and tomorrow.

Figure 10:
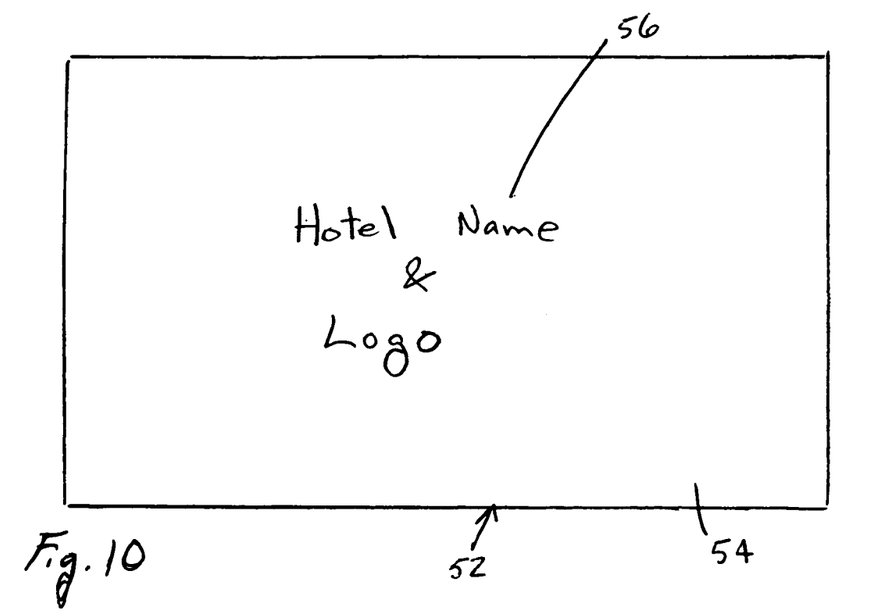
FIG. 10 is a schematic view of a first side of a referral card for use with the system of FIG. 1.
Figure 11:
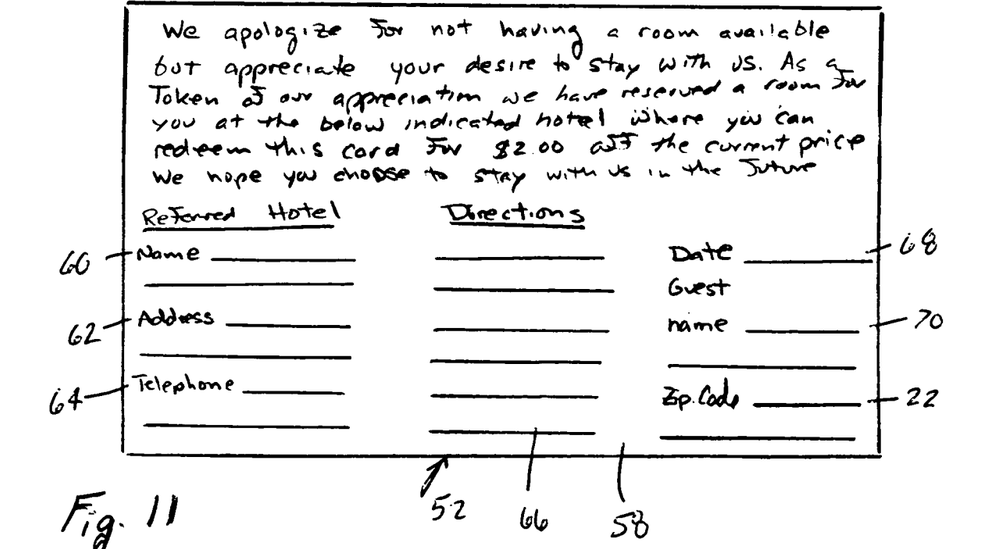
FIG. 11 is a schematic view of a second side of the referral card of FIG. 10.

In order to provide additional incentives for referring travelers, each hotel 14 preferably has referral cards 52 designed for making and tracking referrals. The referral service is used when the hotel 14 is sold out and is referring a traveler to another hotel 14. The hotel 14 calls an available hotel 14 listed on the report 22 and makes a "hold" reservation for the traveler who is in its lobby. The hotel 14 then gives the traveler a completed referral card 52 and sends them to the referred hotel 14. As best shown in FIG. 10, the first side 54 of the illustrated referral card 52 is printed with the hotel's name and logo 56. As best shown in FIG. 11, the second side 58 of the illustrated card 52 is printed with a form to be filled out by the referring hotel 14. The illustrated form includes locations for writing or printing the name 60, phone number 62 and address 64 of the referred hotel 16, directions 66 to the referred hotel 16, the date 68 of the referral, and the name 70 and zip code 72 of the referred traveler for tracking purposes. Preferably, the form includes at least one removable copy to be forwarded to the service provider 12. An additional copy can be included to be retained by the referring hotel 14. The copies can be saved and forwarded to the service provider 12 at a specified time such as, for example at the end of the month.

Preferably, the referral card 52 can be redeemed at the referred hotel 14 to receive a discount such as, for example, the illustrated $2.00, off the referred hotel room. It is noted that the discount can alternatively be a smaller or larger dollar amount if desired. When the traveler presents the card to the referred hotel 14, the referred hotel 14 gives the identified discount off the price of the traveler's room. The referred hotel 14 forwards the redeemed cards to the service provider 12 along with a service fee for each card 52 such as, for example, $1.00 per redeemed card 52. It is noted that the service fee can alternatively be a smaller or larger dollar amount if desired. The redeemed cards and service fees can be saved and forwarded at a specified time such as, for example at the end of the month. The cost to the referred hotel 14 for receiving the referral is the total for the discount amount plus the service fee which in the illustrated example is a total of $3.00 per referral. The service fee is preferably divided between the service provider 12 and the referring hotel 14. For example, the illustrated $1.00 service fee can be evenly split into $0.50 for the service provider 12 and $0.50 for the referring hotel 14. It is noted that the service fee can alternatively be other dollar amounts and the service fee can alternatively be used in other manners or splits.

Figure 12:
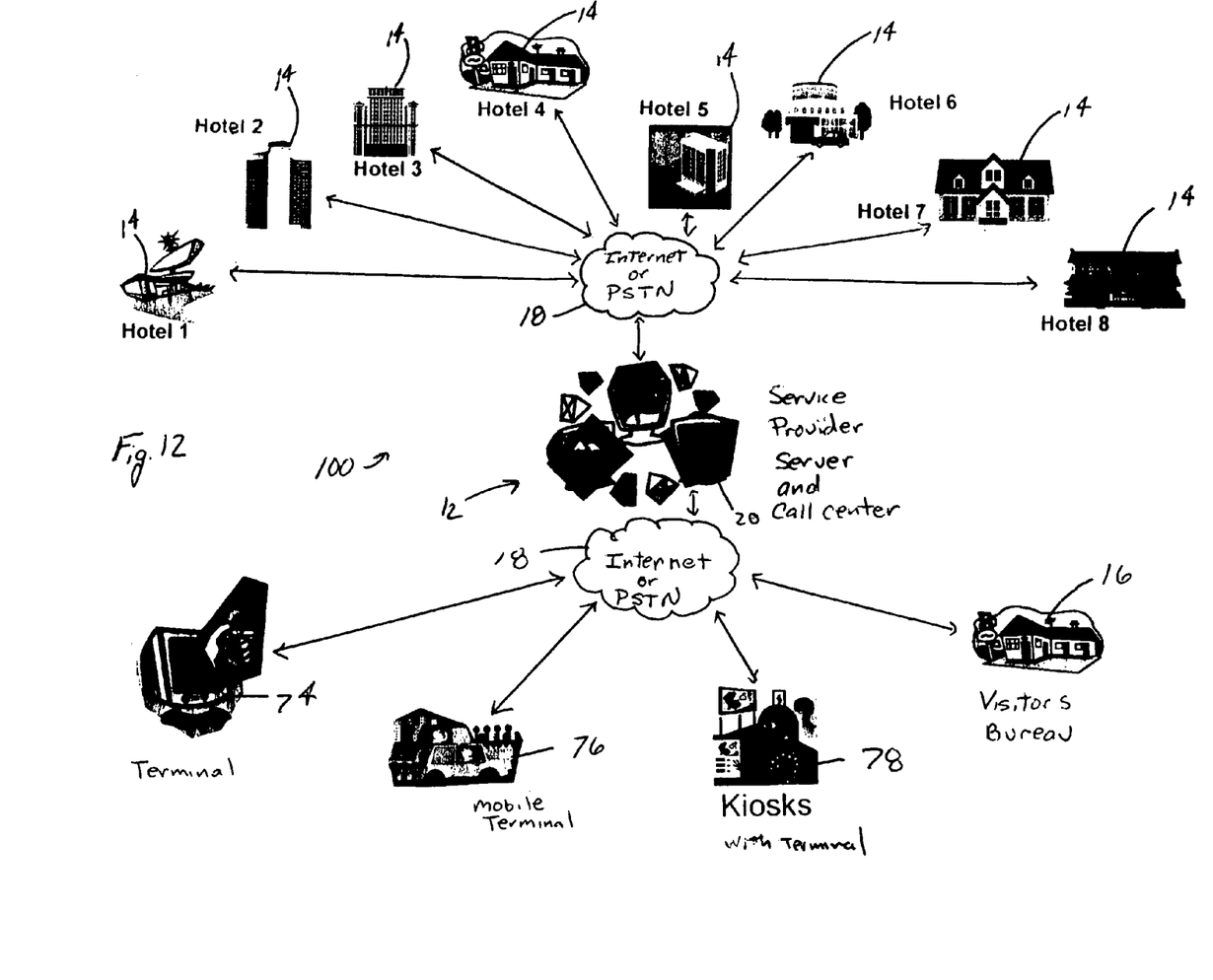
FIG. 12 is a schematic view of a system for providing hotel occupancy information according to a second preferred embodiment of the present invention.

FIG. 12 schematically shows a system 100 for providing hotel occupancy information according to a second preferred embodiment of the present invention. The system is substantially the same as the system according to the first embodiment but illustrates that the communication system can take other forms and other users/terminals can be advantageously linked to the system 100. The illustrated system 100 shows that the hotels 14 and visitors bureaus 16 can be linked to the service provider computer 20 by the internet or other electronic data network. This enables the hotels 14 and visitors bureau 16 to more readily update or change information, add or delete notes, or obtain real time report information. In this manner, the front desks of the hotels 14 could even have stand alone terminals for this purpose.

The system 100 also illustrates that the information provided by the system 100 can be utilized by individuals other than the hotels 14 and visitors bureau 16 such as, for example, potential customers of the hotels 14. The illustrated system 100 shows that anyone with a computer terminal 74 or mobile terminal 76, such as a cell phone, PDA, laptop, or the like, can access the service provider computer 20 via the Internet or other suitable network 18 to search for a suitable hotel 14 which is available. The system 100 can utilize GPS data in order to determine the location of mobile terminals 76 so that hotels 14 in the appropriate area are automatically identified. The illustrated system 100 also shows that stand-alone kiosks 78 can be located in locations such as airports, bus terminals, shopping malls and the like which include computer terminals linked to the service provider computer 20. The kiosks 78 enable potential customers, who do not otherwise have access to an appropriate terminal 74, 76, to locate a suitable hotel 14, make a reservation, and receive directions to the hotel 14.

When the hotels 14 have access to the service provider computer 20 such as through the Internet, the hotels 14 are provided access to specially designed spreadsheets and accounting software "tools" for analyzing the customized reports 22. The hotel 14 can access prior reports as well as accounting and spreadsheet tools for analyzing the reports. Templates and icons make it easy to create reports, charts, and graphs by day, week, or year to date (YTD) and review the area/city/county/state capacity reports and compare percentages. The hotel 14 can also review RevPAR reports (revenue per average room), prior day's average rate and occupancy for the area/city/county/state for all or comparable hotels. While these numbers are not provided on the illustrated customized reports 22 sent to the hotels 14, they are preferably viewable by the hotels because they are important to the lodging industry and are a critical measure of operating performance. Hotels chains with multiple properties preferably have access to an account that links all of the reports 22 for its properties. Specially designed software tools for chain management enable the home office to combine property types, make comparisons using demographic information such as population size, and make reports, summaries, charts, graphs and the like. The computer 20 preferably tracks and makes available for viewing commissions earned from referrals, past averages for rate and availability, how often additional hotels 14 were added to the report, the names of added and deleted hotels, and like information.

Computer access by the hotels 14 enables the referral cards 52 to be individually produced and customized for the specific referral. Preferably, the computer 20 automatically creates and prints the referral card upon the referring hotel providing or selecting information. The customized referral cards 52 can advantageously include a map and directions to the referred hotel. The customized referral cards 52 can also have discount amounts which are unique to the referred hotel 14, that is, some hotels may accept greater discounts than others. The referral cards 52 can also include unique advertisements depending on the referred hotel 14 and can also include a coupon or coupons depending on the referred hotel 14. Such as for example, the coupon could be for use at a restaurant at the referral hotel 14 and/or the referred hotel 14.

It is noted that coupons can be provided in addition to or instead of the discount of the room rate at the referred hotel 14. The referral cards 52 can also be provided with the listing of current events and places 26 discussed hereinabove with regard to the report 22 or any other suitable information.

The computer access by the hotels 14 also empowers the notes 24 on the reports 22 because a manager has the ability to easily place a note 24 on each shift's report 22. The manager can easily leave notes 24 designed to reach a specific person and/or shift and when the report 22 is faxed or viewed over the Internet, the report 22 includes the note. The note 24 can be, for example, a motivational message or a reminder to do something. To insert the note 24, the manager access the account via the Internet, clicks on the icon for notes, selects the appropriate day and shift on a calendar, and types the message in the box which appears.

It is apparent from the foregoing disclosure and detailed description that the system and method of the present invention provides a computerized "call around" reporting service which provides hotels with current occupancy and rate information with which can be used to make real-time rate adjustments in response to the current market conditions. It is also apparent that the system and method ensure that each hotel always has information for providing referrals to potential customers when the hotel is fully occupied and/or overbooked because as hotels are sold out replacement referrals are located and provided.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A method for providing hotel information comprising the steps of, in combination:

arranging with a plurality of hotels for the plurality of hotels to provide room occupancy and rate information to a computer programmed to receive the room occupancy and rate information directly from the plurality of hotels;

receiving room occupancy and rate information in the computer from the plurality of hotels;

providing current information via the computer to each of the plurality of hotels including current daily rate information of the plurality of hotels and current room availability information of the plurality of hotels so that a referring hotel of the plurality of hotels can make at least one of a reservation for a potential customer at an available hotel of the plurality of hotels and a referral of the available hotel to the potential customer; and providing a referral fee to the referring hotel when the potential customer stays at the available hotel in response to at least one of the reservation and the referral.

2. The method according to claim 1, further comprising the step of faxing a report to the plurality of hotels, wherein the report includes the current daily rate information of the plurality of hotels and current room availability information of the plurality of hotels.

3. The method according to claim 1, further comprising the step of providing the current information to the plurality of hotels over a computer network in real time.

4. The method according to claim 1, further comprising the step of providing the current information to include the current daily rate information and the current room availability information for competing hotels.

5. The method according to claim 1, further comprising the step of providing the current information to include occupancy percentage and average daily rate for a predetermined group of the plurality of hotels.

6. The method according to claim 1, wherein the current daily rate information of the plurality of hotels comprises an average daily rate determined by the computer for a predetermined group of the plurality of hotels and the current room availability information of the plurality of hotels comprises a percent occupancy determined by the computer for the predetermined group of the plurality of hotels.

7. A system for providing hotel information comprising, in combination:
 a computer connected to a communication system;
 wherein the computer is programmed to receive occupancy and rate information directly from a plurality of hotels;
 wherein the computer is programmed to provide current information to each of the plurality of hotels including current daily rate information of the plurality of hotels and current room availability information of the plurality of hotels; and
 wherein the computer is programmed to receive referral information from a referring hotel of the plurality of hotels when the referral hotel makes at least one of a reservation for a potential customer at an available hotel of the plurality of hotels and a referral of the available hotel to the potential customer.

8. The system according to claim 7, wherein the computer is programmed to prepare and fax a report to the plurality of hotels, wherein the report includes the current daily rate information of the plurality of hotels and current room availability information of the plurality of hotels.

9. The system according to claim 7, wherein the computer is programmed to provide the current information to the plurality of hotels over a computer network in real time.

10. The system according to claim 7, wherein the computer is programmed to provide the current information to include the current daily rate information and the current room availability information for competing hotels.

11. The system according to claim 7, wherein the computer is programmed to provide the current information to include occupancy percentage and average daily rate for a predetermined area group of the plurality of hotels.

12. The system according to claim 7, wherein the current daily rate information of the plurality of hotels comprises an average daily rate determined by the computer for a predetermined group of the plurality of hotels and the current room availability information of the plurality of hotels comprises a percent occupancy determined by the computer for the predetermined group of the plurality of hotels.

13. The system according to claim 7, wherein the computer is programmed to credit a referral fee to the referring hotel when the potential customer stays at the available hotel in response to at least one of the reservation and the referral.

14. A method for obtaining hotel room occupancy and rate information comprising the steps of, in combination:
 agreeing to provide current room rate information and current room availability information for a participating hotel to a computer of a service provider programmed to receive current room rate information and current room availability information;
 providing the current room rate information and current room availability information for the participating hotel to a service provider;
 receiving from the service provider via the computer current information for a plurality of hotels including current daily rate information of the plurality of hotels and current room availability information of the plurality of hotels so that the participating hotel of the plurality of hotels can make at least one of a reservation for a potential customer at an available hotel of the plurality of hotels and a referral of the available hotel to the potential customer; and
 receiving a referral fee when the potential customer stays at the available hotel in response to at least one of the reservation and the referral.

15. The method according to claim 14, further comprising the step of receiving the current information for the plurality of hotels over a computer network in real time.

16. The method according to claim 14, further comprising the step of providing a referral card including location information of the available hotel to the potential customer.

17. The method according to claim 14, wherein the current daily rate information of the plurality of hotels received from the service provider comprises an average daily rate determined by the computer for a predetermined group of the plurality of hotels and the current room availability information of the plurality of hotels received from the service provider comprises a percent occupancy determined by the computer for the predetermined group of the plurality of hotels.

* * * * *